United States Patent

[11] 3,567,147

[72] Inventors Dieter Engelsmann
 Unterhaching;
 Rolf Schroder; Heinz Ernst, Munich,
 Germany
[21] Appl. No. 797,023
[22] Filed Feb. 6, 1969
[45] Patented Mar. 2, 1971
[73] Assignee AGFA-Gevaert Aktiengesellschaft
 Leverkusen, Germany
[32] Priority Feb. 14, 1968
[33] Germany
[31] P 16 22 173.1

[54] PHOTOGRAPHIC APPARATUS WITH AUTOMATIC FILM THREADING MECHANISM
 17 Claims, 6 Drawing Figs.

[52] U.S. Cl. ................................................. 242/71.1
[51] Int. Cl. ................................................. G03b 1/04
[50] Field of Search .................................... 242/71.1, 71

[56] References Cited
UNITED STATES PATENTS
3,476,475 11/1969 Rudzitis et al. ............... 242/71.1X
3,383,068 5/1968 Winkler et al. ............... 242/71.1

*Primary Examiner*—Nathan L. Mintz
*Attorney*—Michael S. Striker

ABSTRACT: A still camera wherein the inlet of the takeup chamber is adjacent to the discharge end of a film channel. A two-armed lever is pivotally mounted in the camera body behind the takeup chamber so that one of its arms defines with the discharge end of the channel a narrow gap for automatically directing the leader of roll film toward and through the inlet of the takeup chamber. The latter accommodates a rotary takeup reel and a deflecting device which causes the leader to convolute itself around the reel in response to actuation of the film transporting mechanism.

INVENTOR.
DIETER ENGELSMANN
ROLF SCHRÖDER
HEINZ ERNST

PHOTOGRAPHIC APPARATUS WITH AUTOMATIC FILM THREADING MECHANISM

BACKGROUND OF THE INVENTION

The present invention relates to photographic apparatus, especially to still cameras, and more particularly to improvements in automatic film threading mechanisms for cameras.

It is already known to provide in the takeup chamber of the housing in a still camera a rotary takeup reel and to further provide means for automatically directing the leader of roll film into the takeup chamber in response to manipulation of the film transporting mechanism so that the film is convoluted on the reel. In many instances, the rear side of the takeup chamber is separated from the removable or pivotable rear wall of the housing by a rigidly mounted internal partition which provides a relatively narrow slit for entry of the leader into the takeup chamber. The width of the slit is important; it cannot be excessive in order to insure that the leader of the film advances along a predetermined path but it cannot be too small in order to avoid scratching of or other damage to the film. It is difficult to find an optimum width for the slit, and particularly to select such width with a view to insure unimpeded entry of the leader into the takeup chamber as well as to thereupon prevent scratching of the main portion of film. Furthermore, presently known automatic film threading mechanism do not embody any means for changing the position of roll film if the leader happens to be shifted sideways (in its plane) with reference to a predetermined optimum position. This might interfere with proper engagement of sprocket teeth on the takeup reel with perforations along one or both marginal portions of the film.

SUMMARY OF THE INVENTION

It is an object of my invention to provide a photographic apparatus, particularly a still camera, with a novel and improved automatic film threading mechanism which insures proper guidance of the leader of roll film during initial stage of film transport and which does not scratch or otherwise damage the film during subsequent transport of film toward the takeup chamber of the camera body.

Another object of the invention is to provide a photographic apparatus wherein the leader of roll film is automatically shifted sideways to move to a predetermined optimum position in the axial direction of the takeup reel.

A further object of the invention is to provide a photographic apparatus with an automatic film threading mechanism which occupies little room and comprises a small number of simple parts.

An ancillary object of the invention is to provide a film threading mechanism which can be readily installed in many presently known types of photographic apparatus by necessitating only minor alterations in the design of such apparatus.

An additional object of the invention is to provide a photographic apparatus with a rear wall or door which cooperates with the above-outlined improved film threading mechanism.

The invention is embodied in a photographic apparatus for use with roll film of the type having a leader at the forward end thereof. The apparatus comprises a housing or body defining a takeup chamber having an inlet, a film channel provided in the housing and terminating at the inlet of the takeup chamber so that the leader of a film which is moved lengthwise in the channel normally tends to advance toward the inlet of the takeup chamber, and guide means for directing the leader of roll film into the inlet so that the leader can convolute itself around a suitable rotary takeup reel in the takeup chamber in response to manipulation of the film transporting mechanism. The guide means comprises a guide member (preferably a two-armed lever) which is movably mounted in the housing to overlie the inlet of the takeup chamber and includes a portion or arm adjacent to the discharge end of the film channel ahead of the inlet, and a helical spring or analogous biasing means installed in the housing to urge the portion or arm of the guide member toward and preferably into abutment with the film channel so that the latter defines with the arm a gap which is wide enough to permit passage of the leader toward and through the inlet.

The rear wall of the camera housing is preferably arranged to move the arm of the guide member slightly away from the film channel and to thereby widen the aforementioned gap when the rear wall is moved to its closed position so that the film is not scratched or otherwise damaged or defaced in response to repeated manipulation of the film transporting mechanism.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
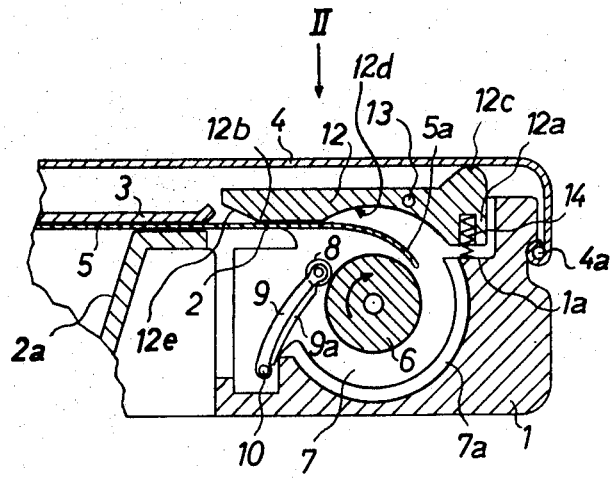
FIG. 1 is a fragmentary horizontal sectional view of a still camera embodying an automatic film threading mechanism which is constructed in accordance with a first embodiment of my invention.
Figure 2:
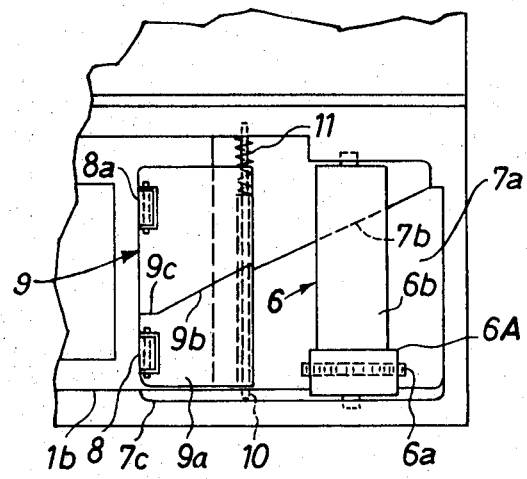
FIG. 2 is a view as seen in the direction of arrow II in FIG. 1 but with the rear wall of the camera body removed and with the film deflecting device shown in inoperative position.

Referring first to FIGS. 1 and 2, there is shown a portion of a still camera which comprises a housing or body 1 defining a film channel 2 which is located behind the light-admitting opening 2a and in front of a customary pressure plate 3. The rear wall 4 of the body 1 constitutes a door which is hingedly connected to the main portion of the body, as at 4a. The photographic roll film 5 has a front end portion or leader 5a which extends into a takeup chamber 7 provided in the body 1 adjacent to the hinge 4a and accommodating a rotary takeup reel or spool 6. The major part of the film 5 is stored on the core of a supply reel in a customary film cartridge (not shown) which is accommodated in the supply chamber of the housing 1. This supply chamber (not shown) is located at the left-hand side of the opening 2a, as viewed in FIG. 1.

Figure 2A:
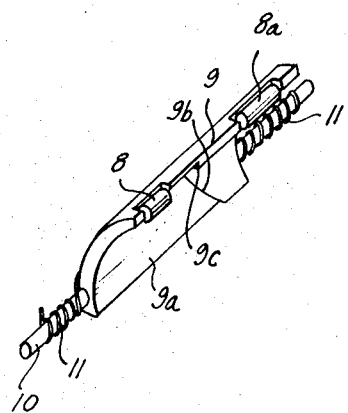
FIG. 2A is a perspective view of the carrier for the deflecting rollers shown in FIG. 2.

The camera is further provided with a novel threading mechanism which causes the leader 5a of film 5 to automatically travel from the channel 2 through the inlet of the takeup chamber 7 and to be convoluted around the takeup reel 6. The latter is rotated in a clockwise direction by a customary film transporting mechanism (not shown), always to such an extent as to advance the film 5 by the length of a frame, i.e., so that an unexposed film frame is located directly behind the opening 2a upon each manipulation of the film transporting mechanism. Such mechanism can include a customary rapid-transport lever, a wheel or other actuating means. The film threading mechanism comprises a deflecting device which includes at least one but preferably two deflecting rollers, 8, 8a which are mounted on a common pivotable carrier or arm 9 (see also FIG. 2A) or on separate carriers so that the carrier for the roller 8 can pivot with reference to the carrier for the roller 8a, or vice versa. The purpose of the rollers 8, 8a is to bear against the adjoining portions of the takeup reel 6 when the camera does not contain film and to press the leader 5a (and thereupon the next-following increments of the film 5) against the reel 6 to insure that the film in chamber 7 forms a series of convolutions which are tightly wound on the reel 6.

Figure 5:
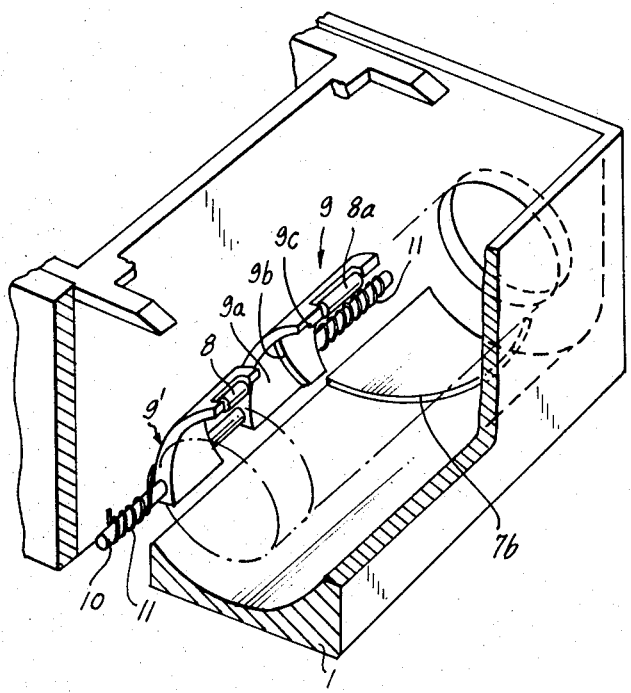
FIG. 4 is a view as seen in the direction of arrow IV in FIG. 3 but with the rear wall of the camera body and FIG. 5 is a perspective view of a portion of a third still camera wherein the deflecting rollers are mounted on discrete carriers.

The arm or carrier 9 for the rollers 8, 8a is mounted on a shaft 10 which is parallel to the axis of the reel 6 and is mounted in the body 1. A torsion spring 11 which is coiled around the lower end portion of the shaft 10 serves as a means for biasing the lever 9 in a clockwise direction, as viewed in FIG. 1, so as to urge the deflecting rollers 8, 8a against the takeup reel 6. When the leader 5a reaches the rollers 8 and 8a (i.e., when the leader almost forms a complete convolution around the reel 6), the rollers 8, 8a press it against the adjoining portions of the reel 6 and insure that friction between the leader 5a *and the peripheral surface of the reel suffices to cause the film to form a succession of tightly wound convolutions in response to repeated manipulation of the film transporting mechanism. If the film 5 is formed with one or more rows of marginal perforations, one or both axial ends of the takeup reel 6 can be provided with an annulus of sprocket teeth 6a* which enter the perforations the insure slippage-free winding of film in response to each manipulation of the film transporting mechanism. The larger-diameter portion 6A at one axial end of the takeup reel 6 shown in FIG. 2 forms a sprocket which carries the teeth 6a. The remaining major portion 6b of the reel 6 has a smaller diameter. Such types of takeup reels are particularly desirable if the deflecting rollers 8, 8a are mounted on separate carriers, such as the carriers 9; 9 shown in FIG. 5, so that the roller 8 can bear against the sprocket 6A and the roller 8a can bear against the smaller-diameter portion 6b.

Serious problems often arise in connection with automatic transport of the leader 5a through the inlet of and into the takeup chamber 7 so that the leader can advance toward and can enter the nip of the reel 6 and deflecting rollers 8, 8a. As a rule, the concave internal surface surrounding the takeup chamber 7 is designed in such a way that it guides the leader 5a toward the deflecting rollers 8, 8a; however, the leader must reach such internal surface before the latter is in a position to guide the film toward the deflecting rollers. In accordance with a feature of my invention, the camera comprises a movable guide member here shown as a two-armed lever 12 which is pivotable on a vertical pin 13 mounted in the body 1 behind the takeup chamber 7 and in front of the rear wall 4. The right-hand portion or arm 12a of the lever 12 bears against an internal stop surface or projection 1a of the body 1 (preferably in interposition of a helical spring 14 which tends to pivot the lever in a counterclockwise direction, as viewed in FIG. 1) and the left-hand portion or arm 12b of the lever 12 overlies the inlet of the chamber 7 and is adjacent to the rightmost portion of the film channel 2. When the rear wall 4 is moved to open position or is fully separated from the remainder of the body 1, the spring 14 is free to expand and to urge a portion of the arm 12 b against a portion of the channel 2 so that these parts define between themselves a rather narrow gap which is wide enough to permit passage of the leader 5a as well as of the remaining portion of film 5. In order to reduce the likelihood of scratching the film 5 by the arm 12b and/or channel 2, the right-hand arm 12a of the lever 12 is preferably provided with a protuberance or follower 12c which is engaged by the rear wall 4 when the latter reassumes the closed position of FIG. 1 whereby the wall 4 automatically widens the gap between the arm 12b and film channel 2.

In order to properly load a fresh film into the camera of FIGS. 1 and 2, the user moves the rear wall 4 to open position and introduces the cartridge into the aforementioned supply chamber at the left-hand side of the opening 2a. The user than introduces the foremost part of the leader 5a of fresh film 5 into the gap between the arm 12b and channel 2. The rear wall 4 is returned to closed position so that the follower 12c widens the gap between the parts 12b and 2. When the user thereupon manipulates the film transporting mechanism, the leader 5a automatically advances along the concave inner side 12d of the lever 12 and engages the concave internal surface of the chamber 7 to advance toward the deflecting rollers 8 and 8a. If the pressure plate 3 extends so close to the takeup chamber 7 that it can properly guide the leader 5a toward the gap between the arm 12b and film channel 2, the user need not introduce the leader into the aforementioned gap, i.e., the user then merely places the leader into the channel 2 and returns the wall 4 to closed position. In response to manipulation of the film transporting mechanism which rotates the takeup reel 6 (as well as one or more sprockets (not shown) at the left-hand side of the opening 2a), the leader 5a automatically enters the gap between the arm 12b and the channel 2 to advance through the inlet of and into the chamber 7. FIG. 1 shows that the right-hand edge of the pressure plate 3 is immediately adjacent to the arm 12b and that this arm is provided with an inclined guide face 12e which directs the foremost part of the leader 5a into the gap between the arm 12b and channel 2 when the film 5 is caused to advance lengthwise.

In accordance with another feature of my invention, the camera of FIGS. 1 and 2 is further provided with novel shifting means for properly guiding the leader 5a in a direction transversely of the film 5, i.e., in the axial direction of the takeup reel 6. The leader 5a is normally adjacent to one edge of the film 5 and it should be directed into the takeup chamber 7 in such a way that its perforation or perforations register with the teeth 6a on the sprocket 6A. To this end, the concave internal surface of the body 1 around the chamber 7 is provided with a groove 7a flanked by a side face 7b which is inclined with reference to the film path (see FIG. 2) so that the width of the groove 7a is greatest in the region (adjacent to the spring 14 and stop surface 1a where the leader 5a enters the groove. If the leader is shifted sideways (toward the spring 11, as viewed in FIG. 2), it engages the side face 7b and is moved downwardly, as viewed in FIG. 2, while simultaneously traveling around the reel 6 and toward the deflecting rollers 8, 8a. The inner side of the carrier 9 (namely, that side which faces the reel 6) is provided with a groove 9a constituting an extension of the groove 7a and bounded by a side face 9b which is an extension of the side face 7b. The width of the groove 9a decreases in a direction toward the deflecting roller 8 and the end portion 9c of the groove 9a has a width which approximates or equals or is even less than the width of the leader 5a. This end portion 9c is immediately or closely adjacent to the roller 8. If the film 5 is running properly, the leader 5a simply advances in the groove 7a and thereupon in the groove 9a without sliding along the side faces 7b and 9b until it enters the end portion 9c and moves into the nip between the roll 8 and reel 6. If the film is slanted or shifted sideways, its leader 5a engages the side face 7b or the side face 9b and is moved sideways toward the end face 7c in the chamber 7 so that it is in line with the adjoining marginal portion 1b of the film channel 2. The arrangement is preferably such that the leader 5a is moved into proper position (as considered in the axial direction of reel 6) before it forms a full convolution around the takeup reel 6; this insures that the foremost part of the leader cannot enter a perforation to this obstruct proper lengthwise advance of the film. In some instances, it is even desirable to design the side faces 7b, 9b in such a way that the leader is moved all the way against the end face 7c, namely, beyond the marginal portion 1b of the film channel 2.

The fact that the follower 12c cooperates with the wall 4 to widen the gap between the arm 12b and film channel 2 when the wall is moved to closed position does not affect the accuracy with which the film 5 is guided in the channel 2 because the wall 4 then maintains the pressure plate 3 in requisite position to urge the film against the channel.

Figure 3:
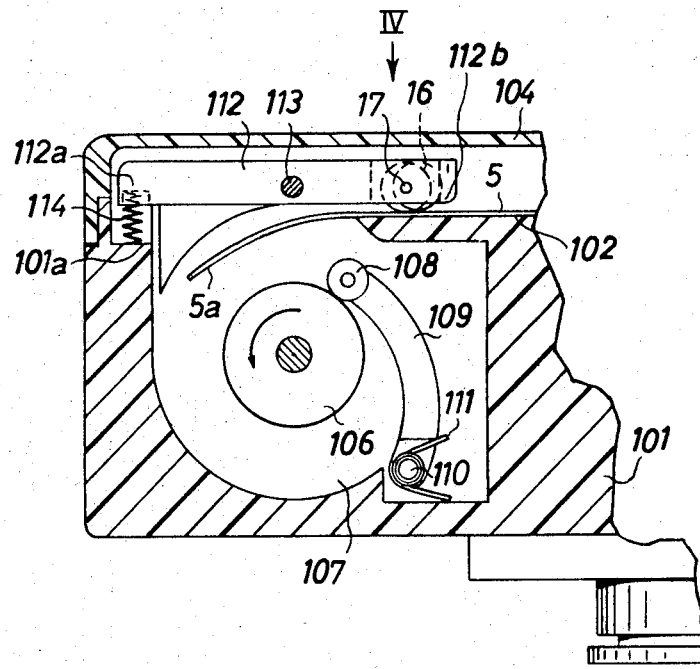
FIG. 3 is a fragmentary horizontal sectional view of a second still camera which embodies a modified film threading mechanism.
Figure 4:
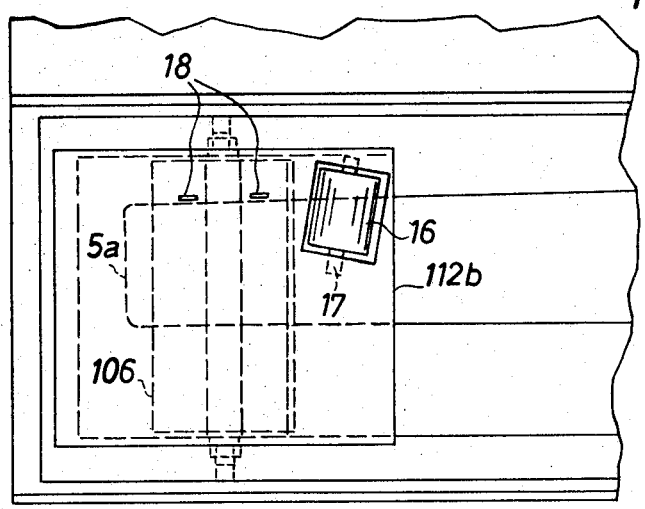

FIGS. 3 and 4 illustrate a portion of a second still camera which is provided with a somewhat modified automatic film threading mechanism. The rear wall 104 is bodily separable from the camera body 101 and the takeup chamber 107 again accommodates a takeup reel 106 which is rotated by the film transporting mechanism. The carrier 109 supports one or more deflecting rollers 108 and is mounted on a vertical shaft 110 which is surrounded by a torsion spring 111 serving as a means for biasing the roller 108 against the adjoining portion of the reel 106. The guide means comprises a two-armed guide member or lever 112 which is fulcrumed in the body 101, as at 113, and has first portion or arm 112a which is biased by a helical spring 114. The latter reacts against the stop 101a. The other portion or arm 112b of the lever 112 carries a shifting roll 16 which is mounted on a shaft 17. The axis of the shaft is not exactly normal to the film path; as shown in FIG. 4, such axis makes with the longitudinal direction of film 5 an oblique angle so that the roll 16 tends to shift the leader 5a sideways toward a pair of lateral stops 18 provided in the body 101. If the leader 5a is introduced into the range of the roll 16 in proper position so that it requires no shifting toward the lateral stops 18, the roll 16 is ineffective because the marginal portion of film 5 then bears against the adjacent marginal portion of the channel 102 and the leader 5a automatically advances along the stops 18 and is convoluted around the takeup reel 106. However, it the leader 5a requires shifting toward the stops 18, such shifting is performed by the roll 16 which insures that the marginal portion of the leader 5a reaches the stops 18 before the leader forms a complete convolution around the reel 106.

The roll 16 and stops 18 can be used in the apparatus of FIGS. 1 and 2 in addition to or as a substitute for the groove 7a and/or 9a.

Without further analysis, the foregoing will so fully reveal the gist of the present invention that others can, by applying current knowledge, readily adapt it for various applications without omitting features which fairly constitute essential characteristics of the generic and specific aspects of my contribution of the art.

We claim:

1. In a photographic apparatus for use with roll film of the type having a leader at the forward end thereof, a combination comprising a housing defining a takeup chamber having an inlet, said housing including a film channel terminating at said inlet so that the leader of a film which is moved lengthwise in said channel normally tends to advance toward said inlet; and guide means for directing the leader into said inlet, said guide means including a guide member movably mounted in said housing to overlie said inlet and having a portion adjacent to said film channel ahead of said inlet, and biasing means for urging said portion of said guide member toward said channel so that the latter defines with said guide member a gap wide enough to permit passage of the leader toward and through said inlet.

2. A combination as defined in claim 1, wherein said guide member is a lever which is pivotably mounted in said housing and includes two arms one of which constitutes said portion thereof and the other of which is adjacent to a stop provided therefor in said housing.

3. A combination as defined in claim 1, wherein said housing comprises a wall which is movable with reference to said guide means between open and closed positions to thereby respectively expose and conceal said film channel, said guide member being disposed between the inlet of said chamber and said wall when the latter assumes its closed position.

4. A combination as defined in claim 1, wherein said guide member is a lever which is pivotably mounted in said housing and includes two arms one of which constitutes said portion thereof and the other of which is adjacent to a stop provided therefor in said housing, said biasing means being interposed between said stop and said other arm.

5. A combination as defined in claim 1, wherein said housing comprises a wall which is movable with reference to said guide means between open and closed positions to thereby respectively expose and conceal said film channel, said guide member comprising follower means which extends into the path of movement of said wall toward closed position so that said wall effects movement of said guide member in a direction to widen the gap between said portion and said film channel.

6. A combination as defined in claim 1, further comprising a rotary takeup reel provided in said chamber, and deflecting means provided in said chamber to bias the leader against the takeup reel.

7. A combination as defined in claim 6, wherein said deflecting means comprises carrier means pivotably mounted in said chamber, at least one deflecting roller rotatably mounted on said carrier means, and biasing means for urging said roller against said takeup reel.

8. A combination as defined in claim 1, further comprising shifting means for moving the leader sideways during entry into said chamber when the leader of the film fails to enter the chamber in a predetermined position.

9. A combination as defined in claim 8, wherein said housing comprises a concave surface surrounding said chamber and said shifting means comprises a groove provided in said surface and being of gradually diminishing width as considered in the direction of travel of the leader in said chamber.

10. A combination as defined in claim 9, wherein said shifting means further comprises a slanting side face provided in said housing and flanking one side of said groove, said side face being engaged by and shifting the leader when the latter fails to enter the chamber in said predetermined position.

11. A combination as defined in claim 9, further comprising a rotary takeup reel mounted in said chamber and deflecting means including carrier means pivotably mounted in said chamber and having a side facing said reel, at least one deflecting roller provided on said carrier means, and biasing means for urging said roller against said reel, said shifting means further comprising a second groove of diminishing width provided in said side of said carrier means and constituting an extension of said first-mentioned groove.

12. A combination as defined in claim 11, wherein said second groove has an end portion of minimum width closely adjacent to said roller, the width of said end portion approximating the width of the leader.

13. A combination as defined in claim 8, wherein said shifting means comprises a roll mounted on said guide member for rotation about an axis making an oblique angle with the longitudinal direction of said film channel, said roll being mounted on said portion of said guide member so that it is adjacent to the film channel.

14. A combination as defined in claim 13, further comprising lateral stop means provided in said housing to engage a marginal portion of the leader which is shifted by said roll during travel along said portion of said guide member.

15. A combination as defined in claim 1, further comprising a rotary takeup reel mounted in said chamber and having a toothed sprocket at one axial end thereof and a smaller-diameter portion extending from said sprocket toward the other axial end thereof, deflecting means including a pair of carriers pivotably mounted in said chamber, a pair of deflecting rollers each mounted on one of said carriers, and biasing means for urging said rollers against said reel, one of said rollers being arranged to bear against said sprocket and the other roller being arranged to bear against the smaller-diameter portion of said reel, and shifting means for moving the leader sideways toward said sprocket during entry into said chamber when the leader fails to enter the chamber in a predetermined position with reference to the axis of said reel.

16. A combination as defined in claim 15, wherein said shifting means comprises a groove provided in the carrier for said one roller and a slanting side face flanking said groove so as to guide the leader axially of the reel and toward said sprocket.

17. A combination as defined in claim 15, wherein said groove has an end portion of minimum width closely adjacent to said one roller, the width of said end portion being less than the width of the leader so that the leader is shifted sideways beyond the adjoining marginal portion of said channel when it reaches the end portion of said groove.